(12) United States Patent
Kanda et al.

(10) Patent No.: US 7,746,755 B2
(45) Date of Patent: *Jun. 29, 2010

(54) OPTICAL DISC DRIVE

(75) Inventors: Yoshihiro Kanda, Osaka (JP);
Yoshihisa Fukushima, Osaka (JP);
Masaru Odagiri, Hyogo (JP)

(73) Assignee: Panasonic Corporation, Osaka (JP)

( * ) Notice: Subject to any disclaimer, the term of this patent is extended or adjusted under 35 U.S.C. 154(b) by 145 days.

This patent is subject to a terminal disclaimer.

(21) Appl. No.: 12/129,146

(22) Filed: May 29, 2008

(65) Prior Publication Data

US 2008/0267049 A1 Oct. 30, 2008

Related U.S. Application Data

(60) Continuation of application No. 11/551,470, filed on Oct. 20, 2006, now Pat. No. 7,406,013, which is a division of application No. 10/276,898, filed as application No. PCT/JP01/04141 on May 17, 2001, now Pat. No. 7,200,085.

(30) Foreign Application Priority Data

May 19, 2000 (JP) ............................. 2000-147687

(51) Int. Cl.
*G11B 7/00* (2006.01)
(52) U.S. Cl. .................. 369/275.3; 369/59.25
(58) Field of Classification Search .............. 369/275.3
See application file for complete search history.

(56) References Cited

U.S. PATENT DOCUMENTS

| 5,012,362 | A | 4/1991 | Ida |
| 5,459,706 | A | 10/1995 | Ogawa et al. |
| 5,621,743 | A | 4/1997 | Tomisawa |
| 5,761,189 | A | 6/1998 | Yamamuro |
| 5,850,382 | A | 12/1998 | Koishi et al. |
| 5,963,524 | A | 10/1999 | Tokiwa et al. |
| 6,072,759 | A | 6/2000 | Maeda et al. |
| 6,081,785 | A | 6/2000 | Oshima et al. |
| 6,088,307 | A | 7/2000 | Fushimi et al. |
| 6,144,625 | A | 11/2000 | Kuroda et al. |
| 6,160,888 | A | 12/2000 | Gotoh et al. |
| 6,324,026 | B1 | 11/2001 | Thomas, III |
| 6,538,982 | B1 | 3/2003 | Van Vlerken et al. |

(Continued)

FOREIGN PATENT DOCUMENTS

EP 0743642 A2 11/1996

(Continued)

*Primary Examiner*—Van N Chow
(74) *Attorney, Agent, or Firm*—Panitch Schwarze Belisario & Nadel LLP

(57) ABSTRACT

In a recordable data storage medium on which property data was recorded after having been modulated and on which data that is decodable by a cryptographic key to be generated from the property data was recorded, the property data was preferably modulated by a different method from that applied to a read-only data storage medium. Then, an optical disc drive, having no ability to distinguish the recordable data storage medium from the read-only data storage medium, cannot read the recordable data storage medium. Consequently, a greater number of drives should be equipped with the function of recognizing the type of a given data storage medium and the copyright protection function should be consolidated.

4 Claims, 10 Drawing Sheets

U.S. PATENT DOCUMENTS

| | | |
|---|---|---|
| 6,707,774 B1 | 3/2004 | Kuroda et al. |
| 6,744,705 B1 | 6/2004 | Sumida et al. |
| 6,901,210 B1 | 5/2005 | Heo et al. |
| 2003/0185128 A1* | 10/2003 | Shoji et al. ............... 369/59.25 |

FOREIGN PATENT DOCUMENTS

| | | |
|---|---|---|
| EP | 0989553 A2 | 3/2000 |
| EP | 1067544 A1 | 1/2001 |
| JP | 06-139700 A | 5/1994 |
| JP | 06-302092 A | 10/1994 |
| JP | 11-096676 A | 4/1999 |

\* cited by examiner

PRIOR ART

OPTICAL DISC DRIVE

CROSS-REFERENCE TO RELATED APPLICATIONS

This application is a continuation of U.S. patent application Ser. No. 11/551,470, filed Oct. 20, 2006, which is a divisional of U.S. patent application Ser. No. 10/276,898, filed Nov. 19, 2002, now U.S. Pat. No. 7,200,085, issued Apr. 3, 2007, which is a Section 371 of International Application No. PCT/JP01/04141, filed May 17, 2001, and the disclosure of which are incorporated herein by reference.

BACKGROUND OF THE INVENTION

1. Technical Field

The present invention relates to a data storage medium such as an optical disc, which can be used effectively to guarantee appropriate copyright protection, and a read drive for use to read the medium.

2. Background Art

Disk storage media, on which various types of data (or information) can be stored, include read-only data storage media and recordable data storage media.

Generally speaking, in the past, read-only drives for reading data that was written on read-only data storage media were popularized first, and then optical disc drives for writing data on recordable data storage media or reading the data that was written on recordable data storage media were popularized. Accordingly, to make the recordable data storage media also readable by the read-only drives, the physical dimensions (including the diameter and thickness of discs), physical properties (such as reflectance) and data recording format of the recordable data storage media were matched with those of the read-only data storage media as closely as possible. As a result, however, even copyrighted data, recorded on a read-only data storage medium, may be easily copied onto a recordable data storage medium. Thus, the copyright of such data has often been infringed.

To avoid this unwanted situation, various techniques of discouraging illegal duplication have been developed and used in the field of optical discs. Hereinafter, a conventional technique of discouraging such illegal duplication will be described with reference to FIGS. 1 through 3.

First, a conventional recordable data storage medium will be described with reference to FIG. 1. Modulated property data 15 is recorded on a recordable data storage medium 1 during the manufacturing process thereof before the storage medium 1 is put on the market. The modulated property data 15 is obtained by getting property data 4 (i.e., information unique to each storage medium) modulated by a modulating section 16. The property data 4 may be a disc ID, for example.

A user who bought the recordable data storage medium 1 can write the data 6 (to be stored in the removable storage medium) on the user area of the recordable data storage medium 1 or read the data 6 from the user area by using an optical disc drive.

Such an apparatus that can write the data on the recordable data storage medium 1 and/or read the data from the medium 1 (i.e., the optical disc drive) includes a demodulating section 17 for demodulating the modulated property data 15 that was recorded on the recordable data storage medium 1 and a decrypting section 10 for decrypting encrypted data 2 that has also been written on the recordable data storage medium 1.

Where the user writes the encrypted data 2 on the recordable data storage medium 1, the data 6 is converted into the encrypted data 2 (e.g., scrambled data) by an encrypting section 7 inside the optical disc drive and then written on the recordable data storage medium 1. The modulated property data 15 that has been recorded in advance on the recordable data storage medium 1 is used for this encryption. More specifically, before the data 6 is encrypted, the modulated property data 15 is read out from the recordable data storage medium 1 and then demodulated by the demodulating section 17. Thereafter, the encrypted data 2 is generated from the data 6 by using the demodulated property data 15.

In reading the data from the recordable data storage medium 1, first, the modulated property data 15 is read and then demodulated into the property data 4 by the demodulating section 17. Next, the encrypted data 2 is read from the user data area on the recordable data storage medium 1 and then transmitted to the decrypting section 10, where the encrypted data 2 is decrypted by using the demodulated property data 4.

Next, a read-only data storage medium will be described with reference to FIG. 2.

After encrypted data 2, modulated property data 15 and recorded encryption data 12 have been recorded on a read-only data storage medium 14 during the manufacturing process thereof, the read-only data storage medium 14 is shipped. The modulated property data 15 is obtained by getting the property data 4 (i.e., information unique to each storage medium) modulated by the modulating section 16.

The encrypted data 2 is generated by encrypting the data 6 with a cryptographic key. This cryptographic key is generated by using encryption data 11. The data 6 to be copyrighted is encrypted with the cryptographic key into the encrypted data 2, which is then recorded on the read-only storage medium 2.

The encrypted data 2 and the recorded encryption data 12 are recorded on different areas on the storage medium during the manufacturing process thereof. The modulated property data 15 may not be recorded on the read-only data storage medium 14. In a DVD-ROM, for example, the recorded encryption data 12 includes cryptographic key information for use in a contents scrambling system (CSS), and the encrypted data 12 is obtained by scrambling the contents of the data 6 in accordance with the information.

A user who bought the read-only data storage medium 14 can decode the encrypted data 2 by using a regular read drive. The read drive for reading such a read-only data storage medium 14 includes: a demodulating section 17 for demodulating the modulated property data 15 that was recorded on the read-only data storage medium 14; a decrypting section 10 for decrypting the encrypted data 2 that was recorded on the recordable data storage medium 1; a type recognizing section 8 for determining whether the storage medium to read is a read-only data storage medium or a recordable data storage medium; and a switch 13 for prohibiting or allowing the use of the recorded encryption data 12 in accordance with the result obtained by the type recognizing section 8.

FIGS. 3(a) through 3(c) are schematic representations showing a physical difference between the read-only data storage medium and the recordable data storage medium. Specifically, FIG. 3(a) illustrates tracks of the read-only data storage medium, FIG. 3(b) illustrates recording tracks of the recordable data storage medium, and FIG. 3(c) illustrates a broader area including the portion shown in FIG. 3(b).

On the read-only data storage medium, pits 51 are formed on the data recording tracks 50 as shown in FIG. 3(a). On the recordable data storage medium on the other hand, recording marks 53 are formed on grooves 52 functioning as data recording tracks as shown in FIG. 3(b). As used herein, the "recording marks" 53 are portions of a recording film, of which the properties (e.g., reflectance) have been changed through the exposure to a laser beam.

On a recordable data storage medium such as a DVD-R or a DVD-RW, pits 54 are formed on a land portion between the grooves 52 and the grooves 52 slightly wind in a regular period and within a predetermined amplitude as shown in FIG. 3(c). Such winding of the grooves 52 is called "wobbling". No track wobbling like this is observed on any read-only data storage medium.

By detecting the groove wobbling such as that shown in FIG. 3(c), the type recognizing section 8 of the read drive can determine whether the storage medium to read is a read-only data storage medium or a recordable data storage medium. A detector that may be used as such a type recognizing section 8 is disclosed in U.S. Pat. Nos. 5,459,706 and 6,088,307, which are hereby incorporated by reference.

As shown in FIG. 2, the encrypted data 2, which has been read out from the read-only data storage medium 14, is decrypted by the decrypting section 10 using the recorded encryption data 12. In this case, the type recognizing section 8 senses that the data storage medium being read is a read-only data storage medium and turns the switch 13 ON. If necessary, the modulated property data 15 is demodulated by the demodulating section 17 and used.

Next, it will be described what if one tries to read the recordable data storage medium 1, onto which the encrypted data 2 and the recorded encryption data 12 were illegally copied as they are from the read-only data storage medium 14, by using the read drive.

In that case, the type recognizing section 8 senses that the storage medium to read is not a read-only data storage medium and turns the switch 13 OFF. As a result, the recorded encryption data 12 is not supplied to the decrypting section 10 and the encrypted data 2 is not decoded.

However, not every read drive includes the type recognizing section 8. A read drive with no type recognizing section 8 cannot distinguish recordable data storage media 1 from read-only data storage media 14 and cannot stop the decrypting section 10 from performing its decrypting operation. As a result, such a read drive reads even the data that was copied illegally onto a recordable data storage medium 1.

As is clear from the foregoing description, a read drive with no ability to distinguish recordable data storage media from read-only data storage media reads the encrypted data not just from a read-only data storage medium or a recordable data storage medium, on which the data was written legally, but also from a recordable data storage medium onto which the encrypted data was illegally copied from a read-only data storage medium.

In the field of optical discs, examples of known read-only data storage media include CD-ROMs and DVD-ROMs while examples of known recordable data storage media include CD-Rs, CD-RWs, DVD-Rs, DVD-RWs and DVD-RAMs.

This illegal duplication problem happens not only in optical discs but also in any other type of data storage media that are formatted such that read-only and recordable versions thereof are both readable by the same read drive In order to overcome the problems described above, an object of the present invention is to provide a recordable data storage medium, from which not a read drive with no ability to distinguish recordable and read-only data storage media but just a read drive that guarantees appropriate copyright protection can read user data that was encrypted with property data.

Another object of the present invention is to provide a read drive that prohibits the decrypting section from decoding encrypted data that was illegally copied onto a recordable data storage medium but that allows it to decode legally copied encrypted data.

BRIEF SUMMARY OF THE INVENTION

Disclosure of Invention

A recordable data storage medium according to the present invention includes an area on which property data, unique to the recordable data storage medium, was recorded and on which user data to be used by a user will be written after having been encrypted with the property data. The user data will be written on the area in the same format as a first data format for a read-only data storage medium. On the read-only data storage medium, user data to be used by the user was written in the first data format and property data, unique to the read-only data storage medium, was recorded in a second data format. At least portion of the property data was recorded on the recordable data storage medium in a third data format that is different from the second data format.

In a preferred embodiment, the at least portion of the property data that was recorded in the third data format includes cryptographic key information for use to encrypt the user data.

In another preferred embodiment, the third data format uses a different modulation method from that of the second data format.

In another preferred embodiment, the modulation method for the third data format satisfies an inverted polarity relationship with respect to the modulation method for the second data format.

In another preferred embodiment, the modulation method for the second data format is a method of converting data "0" into channel data "10" and data "1" into channel data "01", respectively, and the modulation method for the third data format is a method of converting data "0" into channel data "01" and data "1" into channel data "10", respectively.

In another preferred embodiment, the third data format uses a different error correction data format from that of the second data format.

In another preferred embodiment, the error correction data format of the third data format uses a different generator polynomial from that of the error correction data format of the second data format.

In another preferred embodiment, at least portion of the property data was recorded on a burst cutting area (BCA).

An optical disc drive according to the present invention can read user data from a recordable data storage medium, on which property data, unique to the recordable data storage medium, was recorded and on which the user data to be used by a user is writable. The optical disc drive includes: a type recognizing section for distinguishing the recordable data storage medium from a read-only data storage medium; and property data reading means for selecting one of multiple methods of reading the property data in accordance with a result obtained by the type recognizing section.

In a preferred embodiment, the read-only data storage medium has recorded thereon user data to be used by the user and property data, unique to the read-only data storage medium, in first and second data formats, respectively. The user data will be written on the recordable data storage medium in the same first data format as that of the read-only data storage medium and at least portion of the property data was recorded on the recordable data storage medium in a third data format, which is different from the second data format.

In another preferred embodiment, the optical disc drive uses a reading method compatible with the second data format in reading the property data of the read-only data storage medium and uses a reading method compatible with the third data format in reading the property data of the recordable data storage medium.

In another preferred embodiment, if encrypted user data was written on the recordable data storage medium, the optical disc drive decodes the user data in accordance with the information contained in the property data that was recorded on the recordable data storage medium. The type recognizing section distinguishes the read-only data storage medium from the recordable data storage medium by detecting a physical feature of a given data storage medium.

The physical feature is wobbling of recording tracks.

The physical feature is pits that were formed on land portions between recording grooves.

The user data is decodable with a cryptographic key that has been generated from the property data.

The third data format uses a different modulation method from that of the second data format.

The modulation method for the third data format satisfies an inverted polarity relationship with respect to the modulation method for the second data format.

In reading the property data of the read-only storage medium, the property data reading means demodulates channel data "0" into data " " and channel data "1" into data "1", respectively. On the other hand, in reading the property data of the recordable storage medium, the property data reading means demodulates channel data "01" into data "0" and channel data "10" into data "1", respectively.

The third data format uses a different error correction data format from that of the second data format.

The error correction data format of the third data format uses a different generator polynomial from that of the error correction data format of the second data format.

The optical disc drive further includes means for encrypting the user data in accordance with the information contained in the property data. The optical disc drive writes the encrypted user data on the recordable data storage medium.

DETAILED DESCRIPTION OF THE INVENTION

Best Mode for Carrying Out the Invention

Hereinafter, preferred embodiments of the present invention will be described with reference to the accompanying drawings.

On a recordable data storage medium according to the present invention, property data, unique to the storage medium, is recorded after having been modulated during the manufacturing process thereof. The property data (or the modulated property data) is recorded on a different area from the area on which the user, who bought the storage medium, will write his or her data. As for a disklike data storage medium such as that shown in FIG. 4, for example, a "property data recording area" may be defined within a lead-in area that is located inside (i.e., closer to the center of the disc than) the "user data recording area".

The property data may be written in any of various fashions on the property data recording area. On a recordable data storage medium complying with the DVD-R standard, for example, the property data may be written there by forming slits, extending in the disc radial direction, in the reflective film of the storage medium. These slits may be formed by burning off predetermined portions of the reflective film by a laser trimming technique, for example. For that reason, the property data recording area is called a "BCA (burst cutting area)". Those slits extend in the disc radial direction and are arranged in a disc tangential direction.

Figure 5:
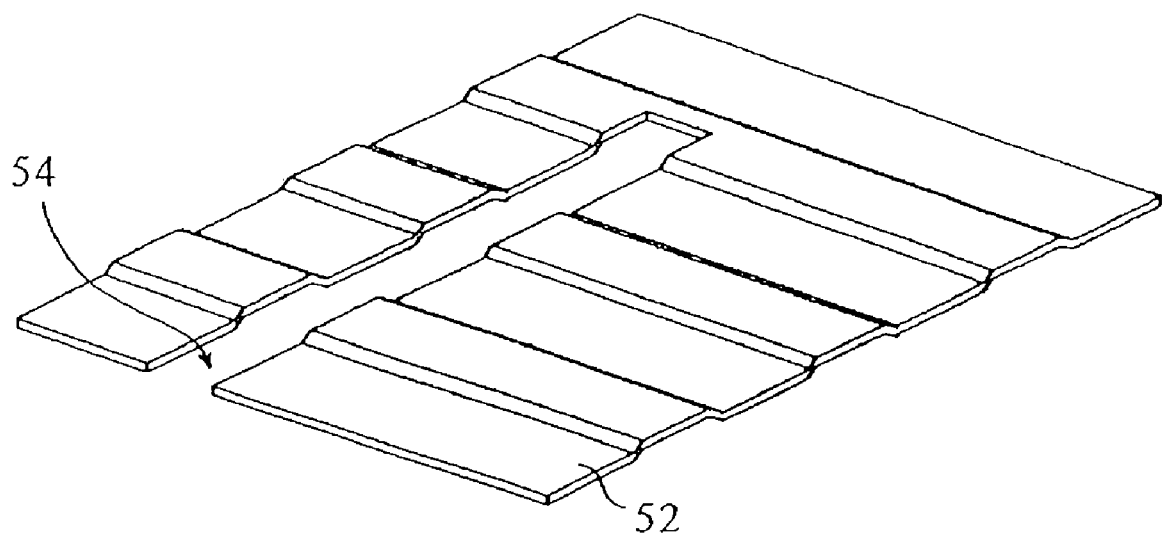
FIG. 5 is a perspective view illustrating a portion of a BCA that may be used to record property data on a data storage medium.

FIG. 5 is a partial perspective view illustrating the surface of a storage medium on which a slit 52 was formed in the reflective film 52 thereof. A portion of the reflective film 52 including the slit 54 and another portion of the reflective film 52 including no slits 54 show different reflectances against an incident laser beam. An optical disc drive such as a read-only drive or a read/write drive can read the property data by focusing a laser beam on the property data recording area of a given storage medium and detecting a variation in the intensity of the reflected light. A method and apparatus of recording a disc ID and other types of property data on a BCA area is described, for example, in U.S. Pat. No. 6,160,888, which is hereby incorporated by reference.

In a DVD-R, an organic dye recording film is sandwiched between a disc substrate including guide grooves for tracking thereon and a reflective film. User data is recorded on the recording film by forming marks in the recording film with a laser beam that has been focused onto the recording film. In a DVD-RW on the other hand, the recording film thereof is made of a phase-change type recording material.

The user cannot change the property data, which was recorded on a recordable data storage medium, by using a normal optical disc drive. The property data includes information that is uniquely given to each storage medium, e.g., a disc ID. When the user encrypts user data and writes the encrypted user data on the user data recording area, the property data may be used as a cryptographic key, for example.

This property data may also be used to decode the encrypted user data. The user data may be written in the same data format on both a read-only data storage medium and a recordable data storage medium, to which the present invention is applicable.

Figure 6:
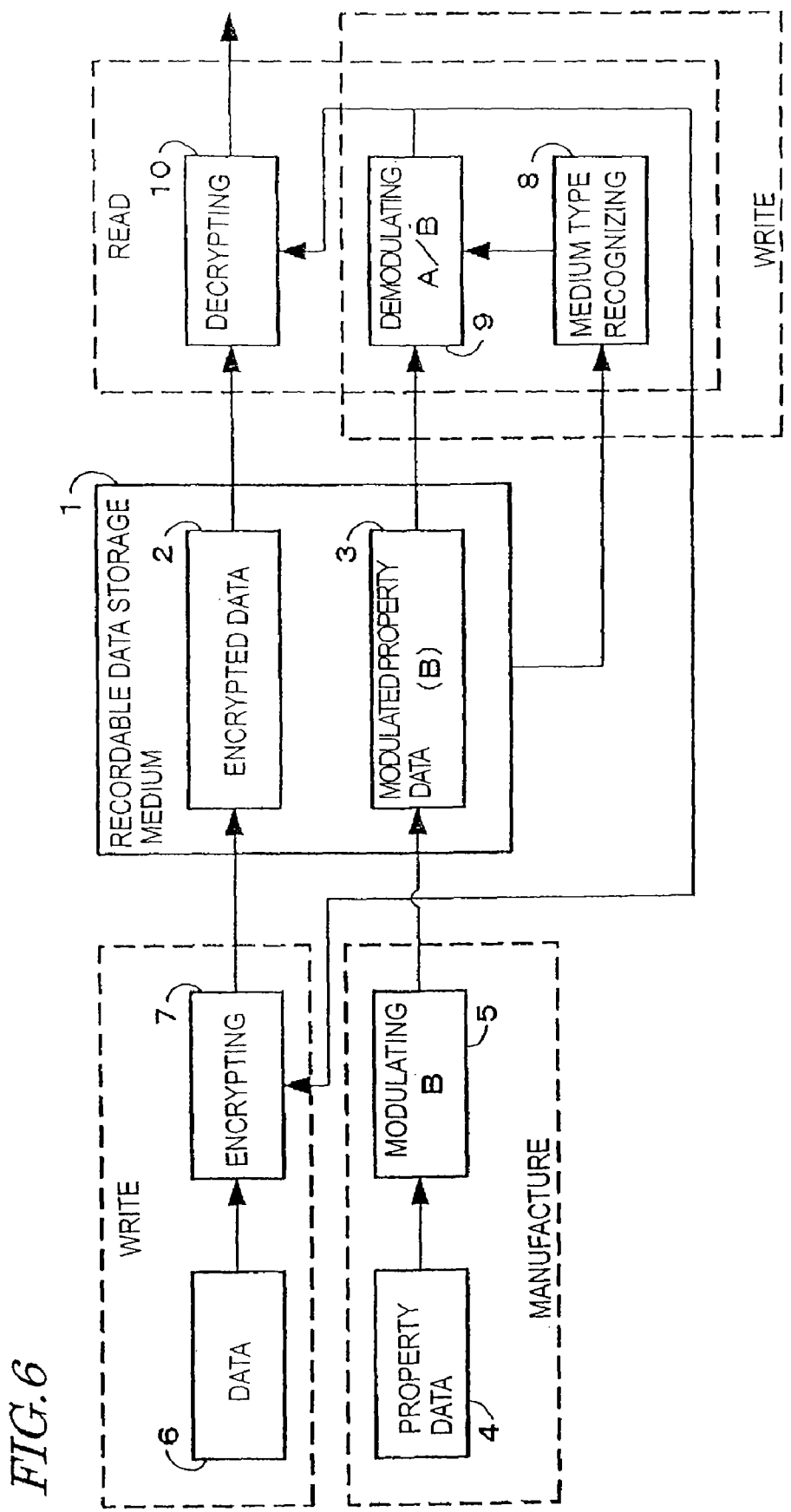
FIG. 6 is a block diagram illustrating the flow of signals in a recordable data storage medium according to the present invention during the manufacturing, recording and playback stages thereof.

Next, FIG. 6 will be referred to. A recordable data storage medium 1 according to this embodiment is shipped after modulated property data 3 was recorded thereon during the manufacturing process thereof as shown in FIG. 6. The modulated property data 3 is obtained by getting property data 4 modulated by a modulating section 5 such as an RZ modulator. In this embodiment, the property data 4 is modulated by a modulation method B, which is different from the conventional one. The conventional modulation method A is the same as the modulation method that is adopted in recording modulated property data on a read-only data storage medium. In contrast, according to this embodiment, the property data 4 is modulated by the modulation method B that is different from the modulation method A, which is one of the principal features of the present invention.

Hereinafter, the difference between the modulation methods A and B will be described with reference to FIGS. 7(a) and 7(b).

Figure 7A:
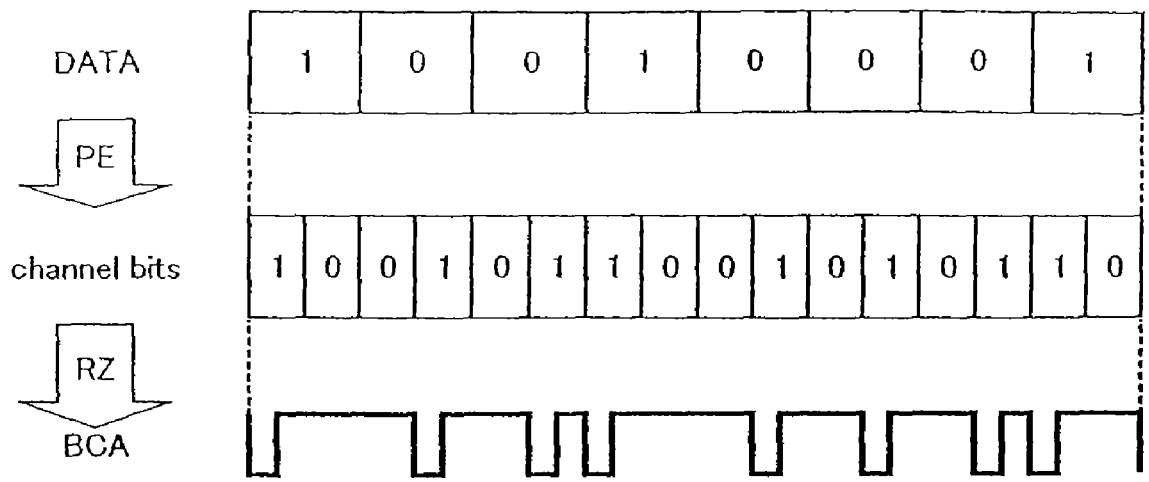
FIG. 7(*a*) shows how property data is modulated in a recordable data storage medium according to the present invention and FIG. 7(*b*) shows how property data is modulated in a read-only data storage medium, which is compatible with the recordable data storage medium of the present invention.
Figure 7B:
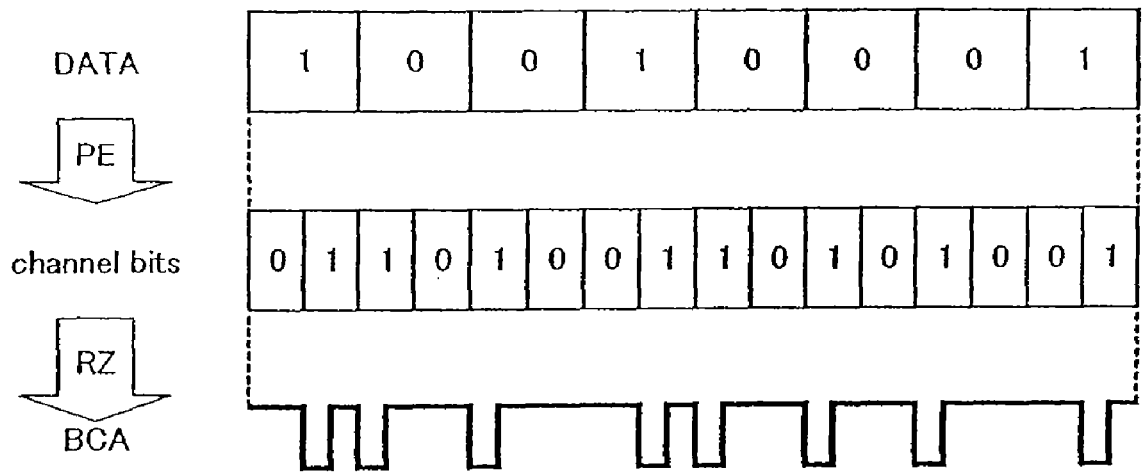

FIG. 7(a) shows an example in which the property data is recorded by the modulation method A, while FIG. 7(b) shows an example in which the property data is recorded by the modulation method B. In FIGS. 7(a) and 7(b), the property data is shown as DATA, which is defined as an arrangement of zeros and ones.

Before recorded on a storage medium, the property data is converted into channel data by a phase encoding (PE) modulation technique. In the modulation method A, data "0" is converted into channel data "10" and data "1" is converted into channel data "01.infin. In the modulation method B on the other hand, data "0" is converted into channel data "01" and data "1" is converted into channel data "10". A pair of modulation methods that satisfies such a relationship will be herein referred to as "modulation methods satisfying an inverted polarity relationship".

As can be seen, even if original property data contains the same information, the PE-modulated property data may be defined by one of two different strings of channel bits depending on whether the property data is modulated by the modulation method A or the modulation method B. In other words, the data format of the property data recorded on the read-only data storage medium is different from that of the property data recorded on the recordable data storage medium. These channel bit strings are recorded on the storage media by an RZ method. In FIGS. 7(a) and 7(b), the waveform identified by "BCA" represents the property data that has been modulated by a PE-RZ modulating section. In accordance with this waveform, slit-like openings are formed on portions of the reflective film that are located in the BCA area of the storage medium (see FIGS. 4 and 5). More specifically, a laser trimming process may be carried out such that the Low level portions of the waveform, representing the modulated property data BCA, correspond to the slits 54 of the reflective film 52 shown in FIG. 5.

In the illustrated examples, the channel bit data is recorded by the RZ method, and the widths of the respective slits formed are constant, typically about 10 .mu.m. It should be noted that any information other than the property data may be included there.

According to the present invention, even when the original property data is the same, the modulated version of the property data has its data format changed depending on whether the property data is subjected to the modulation method A or the modulation method B. Thus, a portion of the storage medium where the modulated property data has been recorded (i.e., a portion of the reflective film that is located in the BCA area) may have one of two different physical shapes (or two different slit arrangement patterns). Accordingly, even if the modulated property data that was recorded on the BCA area of a read-only data storage medium was copied onto the BCA area of a recordable data storage medium, the contents of the original property data could not be demodulated from the modulated property data by any method other than a demodulation method A.

It should be noted that not all of the property data to be recorded on the recordable data storage medium has to be modulated by the modulation method B. Rather at least portion of the property data to be recorded there needs to be modulated by a different modulation method.

Next, a read drive for reading the data that was written on the recordable data storage medium of the present invention will be described.

This read drive includes: a type recognizing section 8 for recognizing the type of a given storage medium to read as a read-only data storage medium or a recordable data storage medium; and a demodulating section 9 for demodulating the modulated property data 3 by selecting either the demodulation method A or the demodulation method B in accordance with the result obtained by the type recognizing section 8. In the other respects, this read drive may have the same configuration as the conventional read drive or read/write drive.

A read/write drive for writing user data on the recordable data storage medium of the present invention includes not only various units, each having the same function as the counterpart of the read drive, but also other known units for use to write the data.

Next, it will be described how to write encrypted data on a recordable data storage medium by using the read/write drive.

FIG. 6 will be referred to again. First, the modulated property data 3 is demodulated by the demodulating section 9, the output of which is sent to an encrypting section 7. In this case, since the medium type recognizing section 8 has sensed that the storage medium that has been inserted into the read/write drive is a recordable data storage medium, the demodulation method B is used in the demodulating section 9. The property data that has been demodulated by the demodulating section 9 is used to get the data 6 encrypted, and converted into the encrypted data 2, by the encrypting section 7.

Next, it will be described with reference to FIG. 6 again how to read the encrypted data from the recordable data storage medium 2 by using the read drive or read/write drive of the present invention. In this case, in accordance with the result obtained by the type recognizing section 8, the demodulation method B is also selected for use in the demodulating section 9. As a result, the modulated property data 3 is demodulated by the demodulating section 9 appropriately. Then, the property data 4 demodulated is supplied to the decrypting section 10 and used to decrypt the encrypted data 2.

Next, it will be described what if one tries to read the recordable data storage medium of this preferred embodiment by using a conventional read drive having no ability to recognize the type of the given storage medium to read (or whether it is a recordable data storage medium or not). In that case, the demodulating section can adopt only the demodulation method A. Accordingly, the demodulating section cannot appropriately demodulate the modulated property data 3 that was modulated by the modulation method B, and cannot decode the encrypted data 2. Thus, to read the recordable data storage medium of the present invention, the read drive must be able to determine whether the given data storage medium is a read-only data storage medium or a recordable data storage medium. Then, a greater number of read drives should be equipped with the function of recognizing the type of a given data storage medium and the copyright protection should be consolidated.

Figure 8:
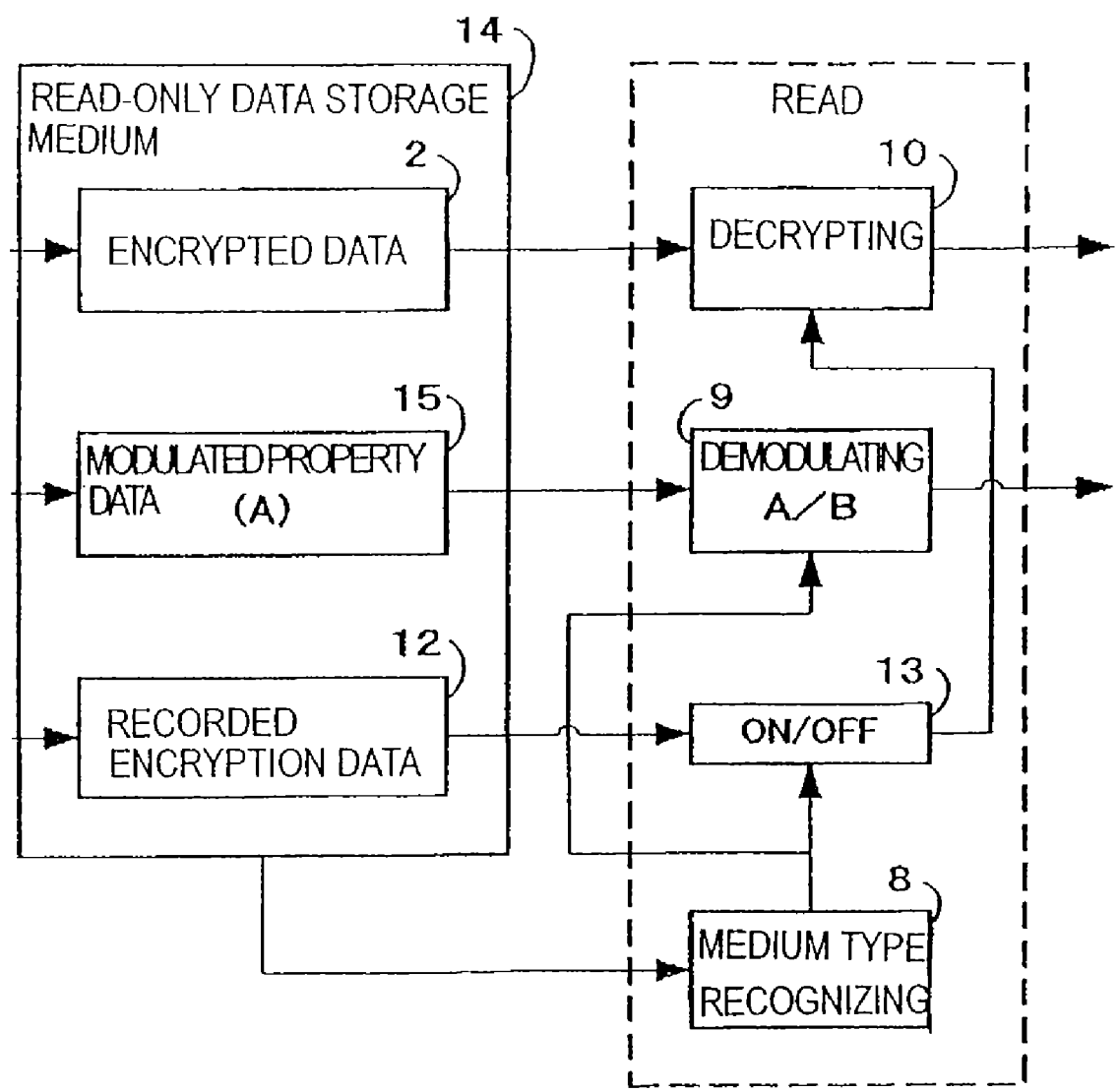
FIG. 8 is a block diagram illustrating the flow of signals while a read-only data storage medium, which is compatible with the recordable data storage medium of the present invention, is read by a read drive according to the present invention.

Next, it will be described with reference to FIG. 8 how to read the read-only data storage medium 14 with the read drive of the present invention.

Figure 1:
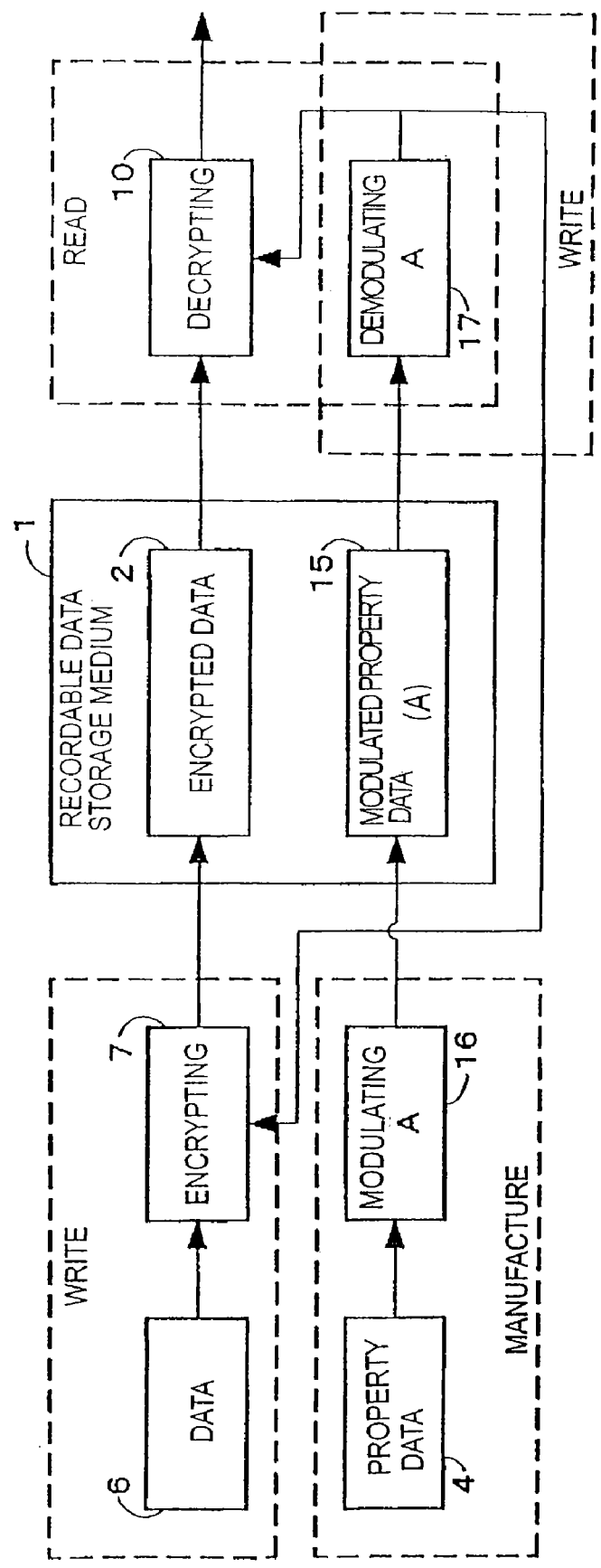
FIG. 1 is a block diagram illustrating the flow of signals in a conventional recordable data storage medium during the manufacturing and playback stages thereof.
Figure 2:
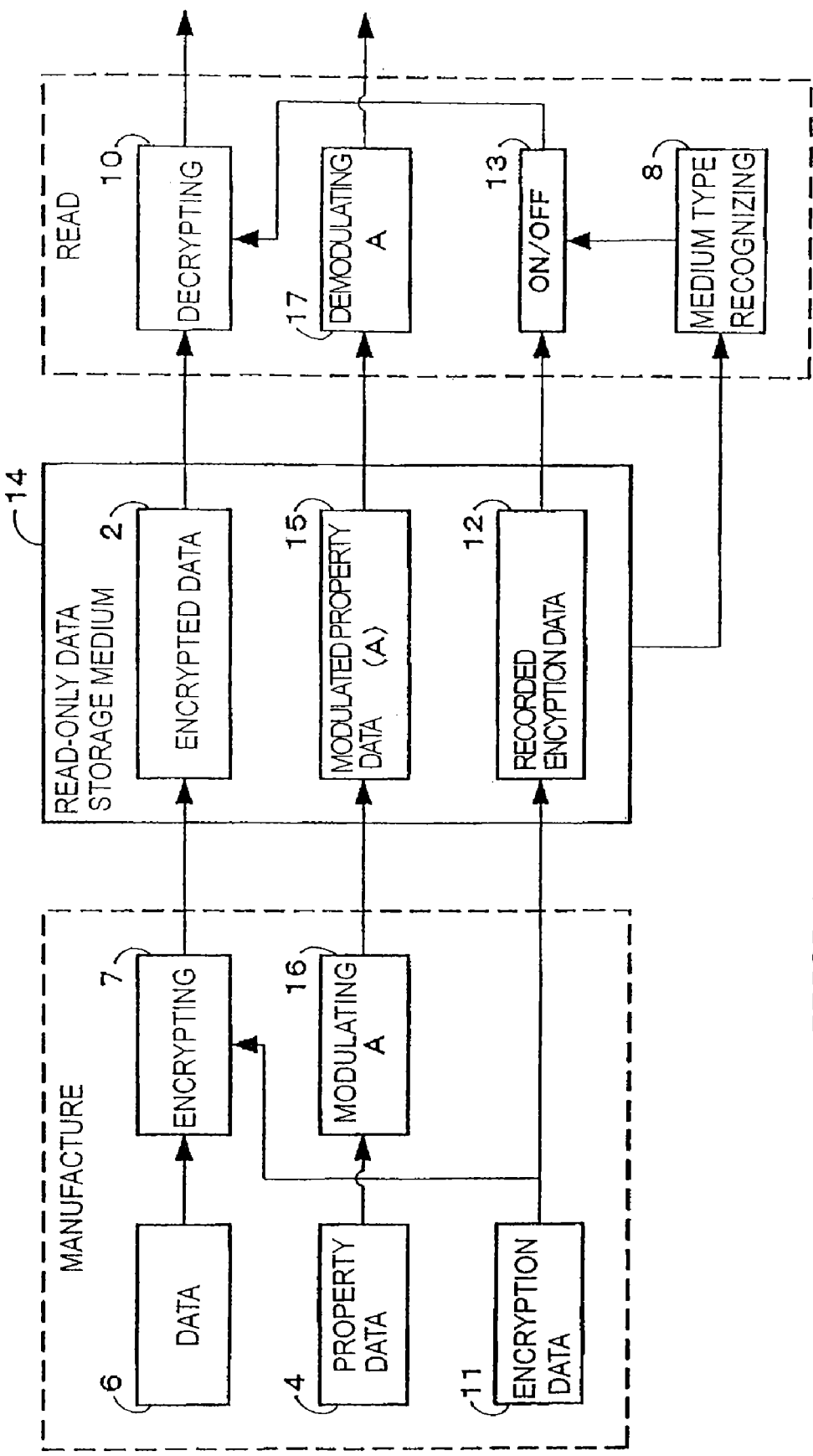
FIG. 2 is a block diagram illustrating the flow of signals in a read-only data storage medium during the manufacturing and playback stages thereof.
Figure 3A:
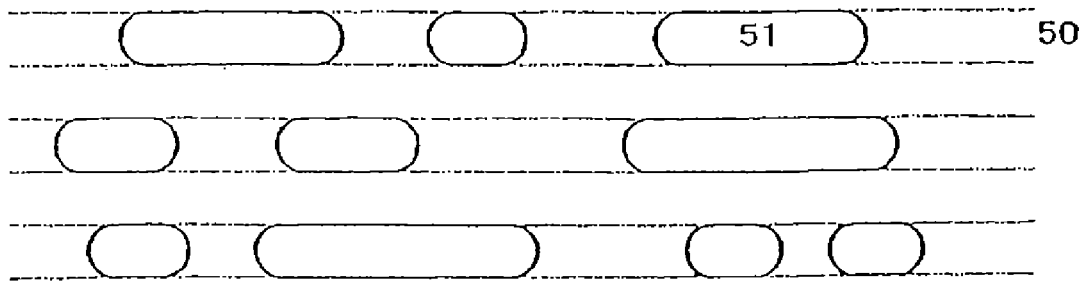
FIGS. 3(*a*) through 3(*c*) illustrate the physical features of user data areas in a read-only data storage medium and a recordable data storage medium.
Figure 3B:
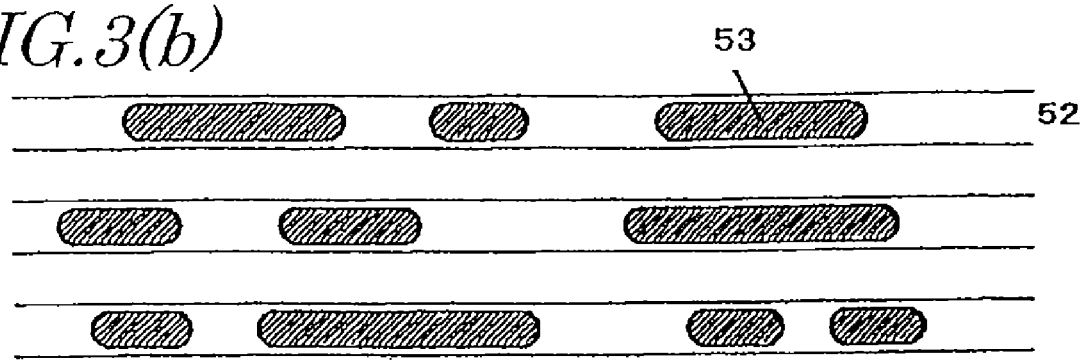
Figure 3C:
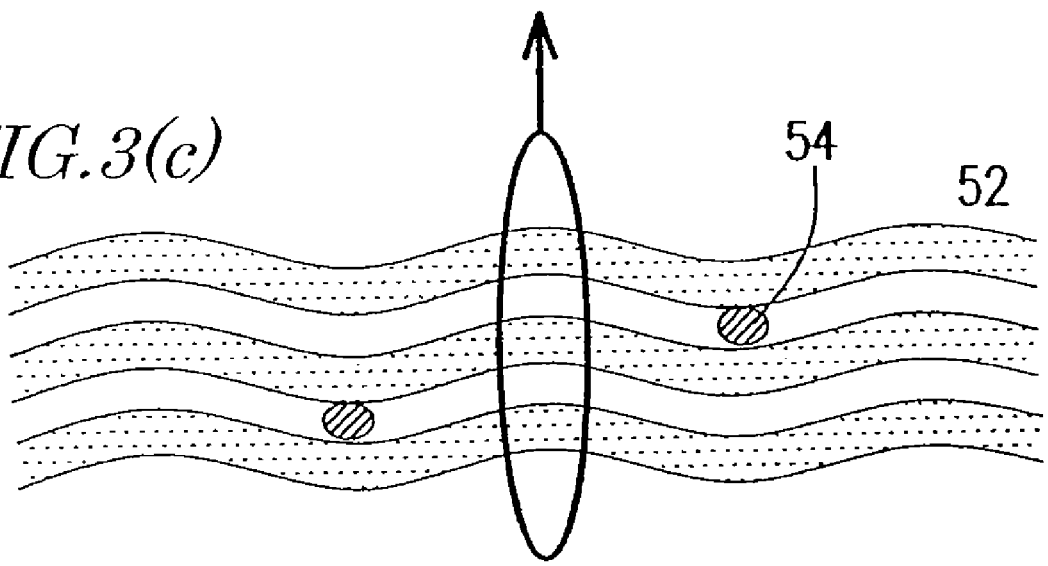
Figure 4:
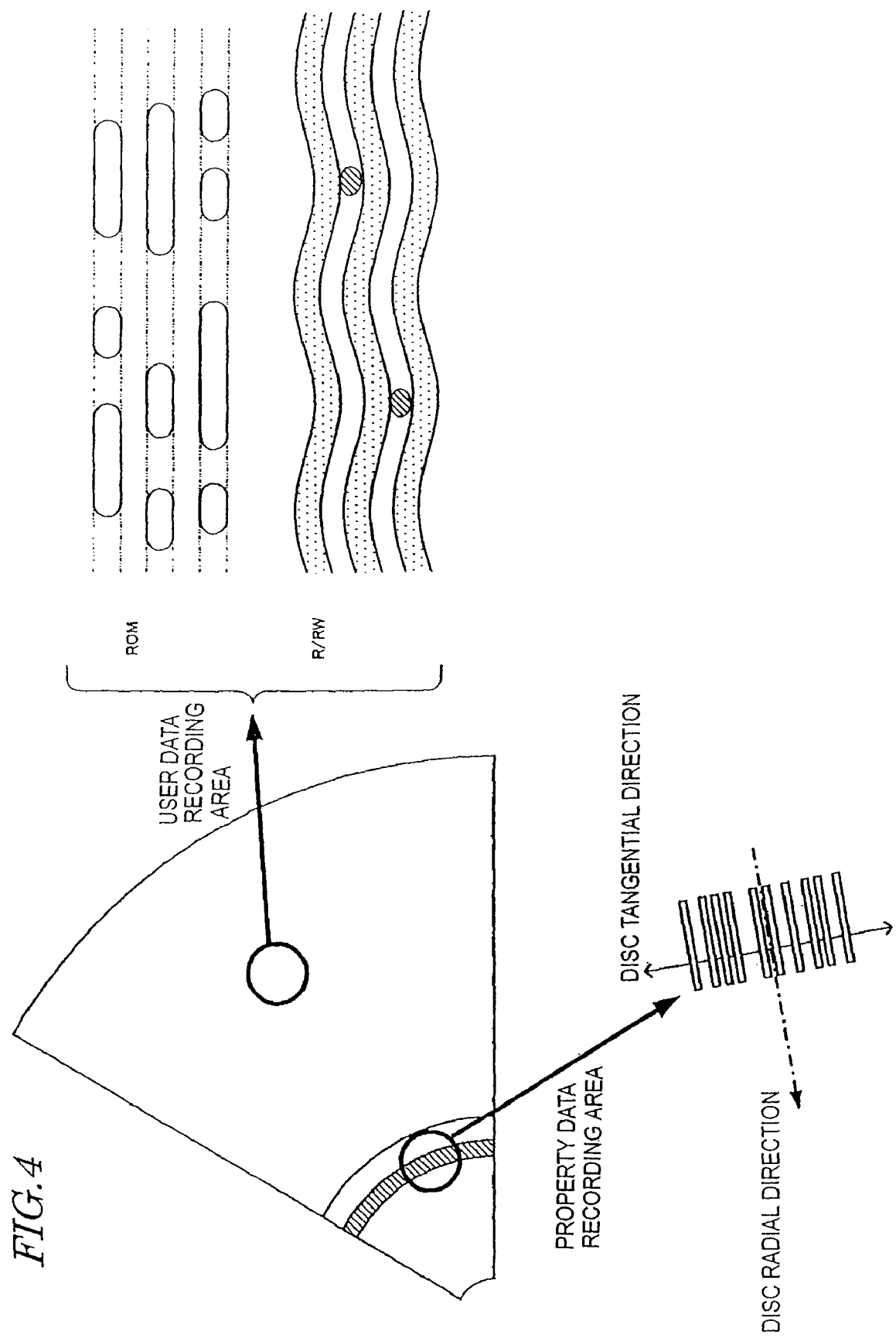
FIG. 4 illustrates a portion of a read-only data storage medium (DVD-ROM) and a portion of a recordable data storage medium (DVD-R or DVD-RW)

The read-only data storage medium is supposed to be manufactured as already described with reference to FIG. 4 and the description thereof will be omitted herein. On the read-only data storage medium 14, the modulated property data 15, which was modulated by the modulation method A, was recorded.

During the read operation, the type recognizing section 8 senses the storage medium to read as a read-only data storage medium, thereby turning the switch 13 0N. Also, since the storage medium to read is a read-only data storage medium, the demodulation method A is selected in accordance with the result obtained by the type recognizing section 8. As a result, the modulated property data 15 is demodulated appropriately.

Next, it will be described what if one tries to read the recordable data storage medium 1 on which the encrypted data 2 and the recorded encryption data 12 were illegally copied as they are from the read-only data storage medium 14. In that case, the type recognizing section 8 senses that the storage medium to read is not a read-only data storage medium. Accordingly, the switch 13 is turned OFF and the recorded encryption data 12 is not supplied to the decrypting section 10. As a result, the encrypted data 2 cannot be decoded.

Next, it will be described how to read the recordable data storage medium, on which user data was written legally, with the read drive. In that case, the type recognizing section 8 senses that the storage medium to read is not a read-only data storage medium. Accordingly, the switch 13 is turned OFF and the recorded encryption data 12 is not supplied to the decrypting section 10. However, since the storage medium to read is a recordable data storage medium, the demodulation method B is selected in accordance with the result obtained by the type recognizing section 8. As a result, the modulated property data 15 is demodulated appropriately. Then, the decrypting section 10 can decode the encrypted data 2 by using the modulated property data 15.

Figure 9:
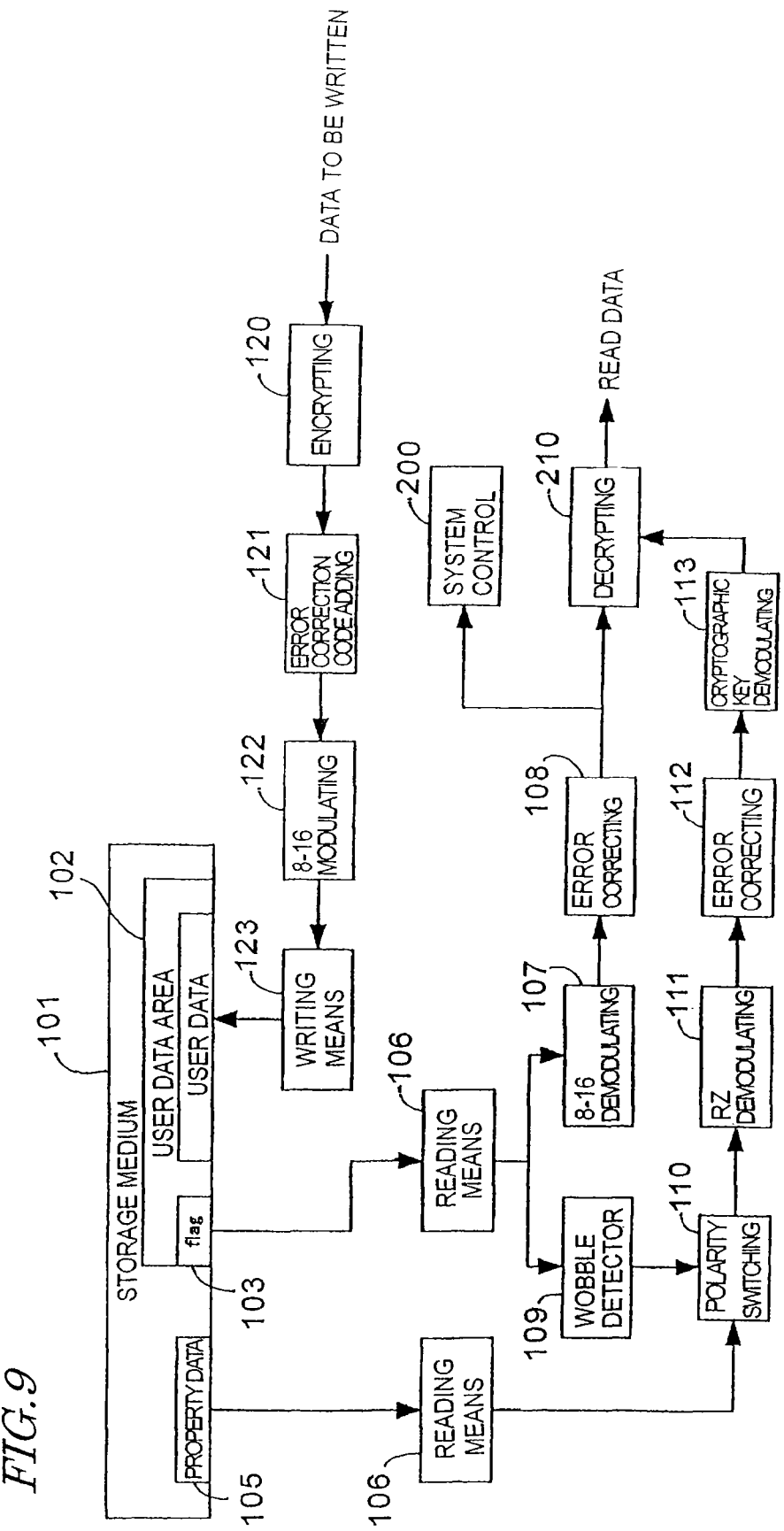
FIG. 9 shows how a write operation is performed on a DVD-R disc, which is used as a recordable data storage medium according to the present invention.

Next, the flow of signals during a read operation being performed on a DVD-R, which is used as a specific exemplary recordable data storage medium, will be described with reference to FIG. 9. On the DVD-R disc 101 shown in FIG. 9, property data 105, which had been modulated by the modulation method B, was recorded.

In reading data from the DVD-R disc 101, the flag information 103, which was recorded on the user data area 102 of the disc 101, is read out by reading means 106 and the wobbling of the disc 101 is detected. The output of the reading means 106 is demodulated by an eight-to-sixteen demodulating section 107 and then subjected to error correction processing by an error correcting section 108. Thereafter, the flag information 106 is sent to a system control section 200. When the presence of wobbling on the disc 102 is detected by a wobbling detector 109, a polarity switching section 110 performs a "polarity switching" operation.

By reference to the flag information 103, the system control section 200 recognizes the disc 101 as a DVD-R and instructs the reading means 106 to read the property data 105. In response, the reading means 106 moves from the user data area 102 toward an inner area of the disc 101 to read the property data 105. The property data that has been read out in this manner goes through the polarity switching section 110, RZ demodulating section 111 and error correcting section 112 so as to be demodulated and supplied as a cryptographic key to decrypting section 210. The error correcting sections 112 and 107 may be implemented by the same circuit.

When the system control section 200 instructs writing user data, the user data (or recording data) is encrypted by an encrypting section 120 with the cryptographic key. An error correction code is added by an error correction code adding section 121 to the encrypted user data, which is then modulated by an eight-to-sixteen modulating section 1200. Thereafter, the user data is written by writing means 123 on the user data area of the disc 101.

The reading means 106 is implementable as an optical pickup including the writing means 123. The tracking control over the optical pickup may be turned ON in reading the user data but may be turned OFF in reading the property data from the BCA area.

Figure 10:
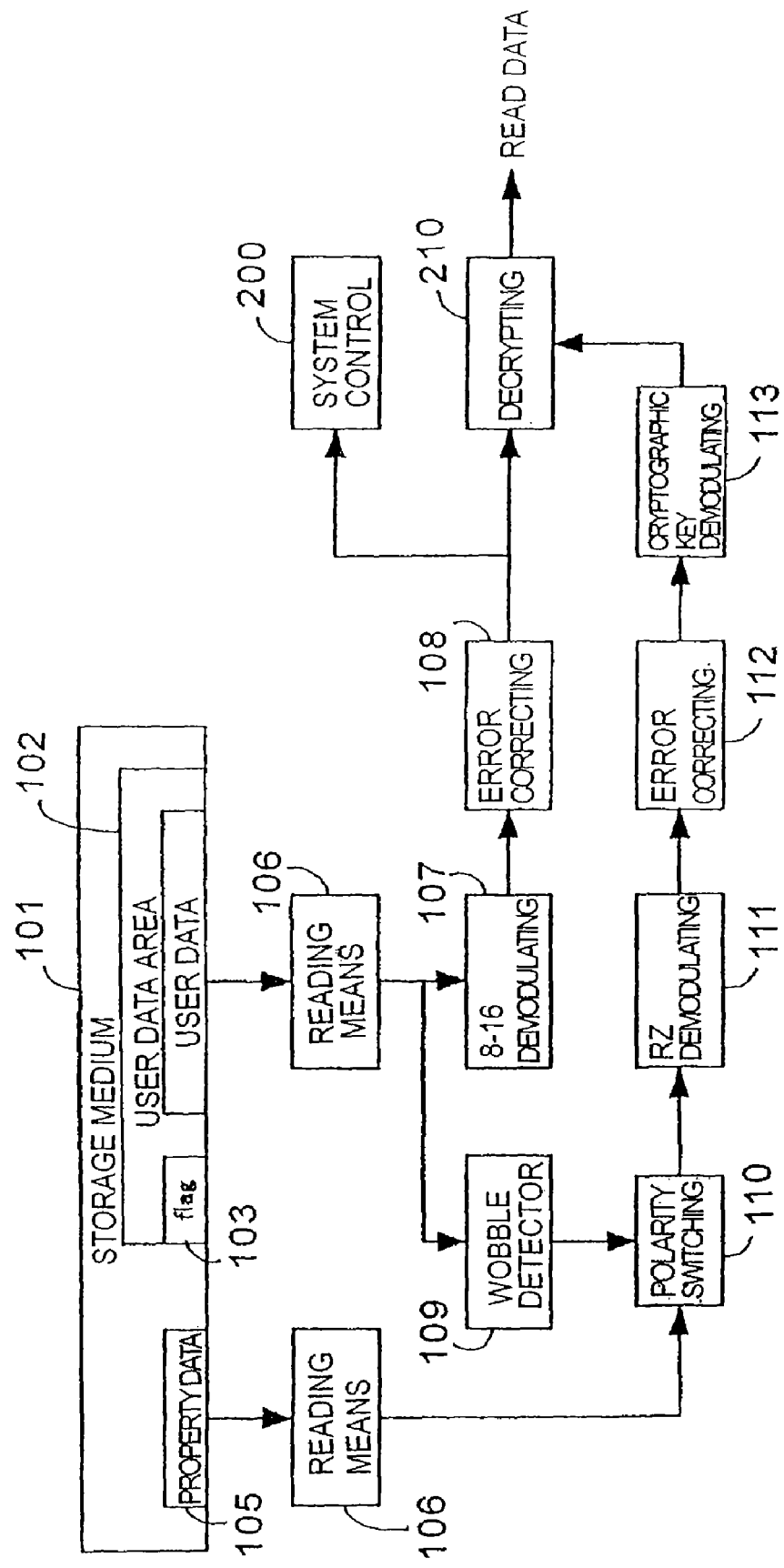
FIG. 10 shows how a read operation is performed on the DVD-R disc that is used as the recordable data storage medium of the present invention.

Hereinafter, it will be described with reference to FIG. 10 how to read the encrypted user data from the DVD-R.

First, the flag information 103 that was recorded on the user data area 102 of the disc 101 is read out by the reading means 106 while wobbling is detected by the wobbling detector 109. The output of the reading means 106 is processed by the eight-to-sixteen modulating section 107 and the error correcting section 108 and then supplied to the system control section 210.

When the presence of wobbling on the disc 101 is detected by the wobbling detector, the polarity switching section 110 performs the "polarity switching" operation.

On detecting, by reference to the flag information 103, that the user data was encrypted with the property data, the system control section 200 instructs the reading means 106 to read out the property data 105. The property data 105 that has been read out by the reading means 106 is processed by the polarity switching section 110, RZ demodulating section 111 and error correcting section 112 so as to be reproduced. Then, the reproduced property data is demodulated by a cryptographic key demodulating section, thereby reading out the cryptographic key. Then, the cryptographic key is supplied to the decrypting section 210.

When the system control section 210 instructs reading the user data, the user data is processed by the eight-to-sixteen demodulating section 107, error correcting section 108 and decrypting section 210 so as to be read out. The cryptographic key that has been demodulated from the property data is used for decryption.

If the encrypted data (i.e., user data) that had been recorded on a DVD-ROM disc 101 was illegally copied onto the DVD-R, the property data that was used to encrypt the user data does not match the property data that was recorded on the DVD-R disc during the manufacturing process thereof. Accordingly, the encrypted data that has been copied onto the user data area 102 cannot be decrypted by reference to the property data that has been read out from the DVD-R disc 101. Suppose the property data of the DVD-ROM could be written on the property data recording area of the DVD-R disc by some way or other. Even so, since the property data of the DVD-ROM disc and that of the DVD-R disc were modulated by mutually different methods, the property data that has been demodulated by the RZ demodulating section 111 is regarded as an error by the error correcting section 112. As a result, the cryptographic key demodulating section fails to demodulate the cryptographic key on the DVD-ROM disc 101. Consequently, the encrypted data cannot be decrypted or decoded.

Even if a CSS key has been copied from a DVD-ROM disc onto a DVD-R disc, the read drive does not decode the CSS key on sensing the given storage medium as a DVD-R through wobbling detection.

Every read drive that can read the recordable data storage medium of the present invention has the type recognizing section 8. Accordingly, the switch 13 may be controlled with just a slight increase in cost.

Also, since the conventional read drive includes a circuit that carries out the demodulation method A, the function of selectively carrying out the demodulation method A or the demodulation method B is realizable only by adding an inverter and a selector to the circuit. In this manner, the copyright protection can be consolidated with just a slight increase in cost.

It should be noted that the type recognizing section 8 may distinguish the recordable data storage medium from the read-only data storage medium by any method other than the method of detecting the groove wobbling as shown in FIG. 5(*c*). For example, a method of detecting pits from the lands between the grooves may also be used.

As described above, according to the present invention, a data format for use to read or write property data from/on a read-only data storage medium is different at least partially from a data format for use to read or write property data from/on a recordable data storage medium. In the preferred embodiments described above, these data formats are distinguished from each other by applying mutually different data modulating methods thereto. However, the present invention is not limited to these specific preferred embodiments. For example, the error correction data format for the property data may be different between the read-only and recordable ones. In that case, the generator polynomial of the error correction data format may be changed.

Alternatively, the information specifying the type of the particular data format, which was actually selected from multiple types of data formats for the property data and used to record the property data, may be written on a track (user data area) of the recordable data storage medium.

INDUSTRIAL APPLICABILITY

If user data written on a recordable data storage medium according to the present invention was encrypted with its property data, then a read drive with no ability to distinguish the recordable data storage medium from a read-only data storage medium cannot decode the user data. Then, a greater number of read drives should be equipped with the function of recognizing the type of a given data storage medium and the copyright protection can be consolidated.

A read drive according to the present invention cannot read illegally copied encrypted data from a recordable data storage medium but can read legally copied encrypted data from the recordable data storage medium. Thus, as for legally copied materials, the present invention is not unbeneficial for the users at all.

We claim:

1. A recordable data storage medium, including a burst cutting area on which property data, unique to the recordable data storage medium, was recorded and, an information area on which user data to be used by a user is written,
   wherein the user data is written on the information area in the same format as a first data format for a read-only data storage medium, on which user data to be used by the user was written in the first data format and on which property data, unique to the read-only data storage medium, was recorded in a second data format,
   wherein at least a portion of the property data was recorded on the burst cutting area of the recordable data storage medium in a third data format that is different from the second data format, and
   the third data format uses a different modulation method from that of the second data format and satisfies an inverted polarity relationship with respect to the modulation method of the second data format, and
   the modulation method for the second data format is a method of converting data "0" into channel data "10" and data "1" into channel data "01", respectively, and the modulation method for the third data format is a method of converting data "0" into channel data "01" and data "1" into channel data "10", respectively, and
   there are plurality of barcode-like marks in the burst cutting area, extending in the radial direction and arranged in a circumferential direction.

2. The recordable data storage medium of claim 1, wherein the at least a portion of the property data that was recorded in the third data format includes cryptographic key information for use to encrypt the user data.

3. A reproducing method for the recordable data storage medium of claim 1, said method comprising;
   recognizing a type of the storage medium by distinguishing the recordable data storage medium from a read-only data storage medium;
   reading the property data of the recordable data storage medium using a reading method compatible with the third data format when the type of the storage medium is the recordable data storage medium.

4. The reproducing method of claim 3, wherein the at least of the property data that was recorded in the third data format includes cryptographic key information for use to encrypt the user data.

\* \* \* \* \*